(No Model.)
R. E. ISMOND.
HOSE OR PIPE COUPLING.
No. 357,603.  Patented Feb. 15, 1887.
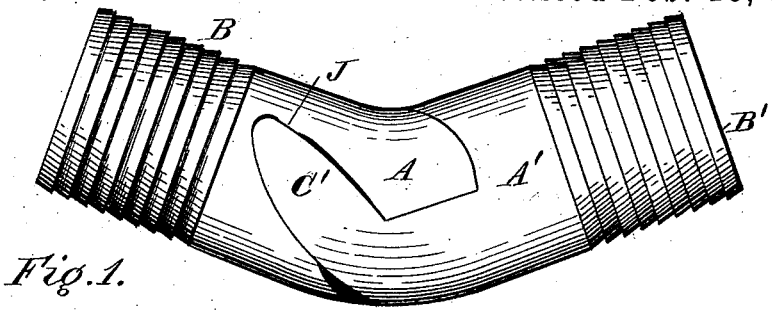
Fig. 1.
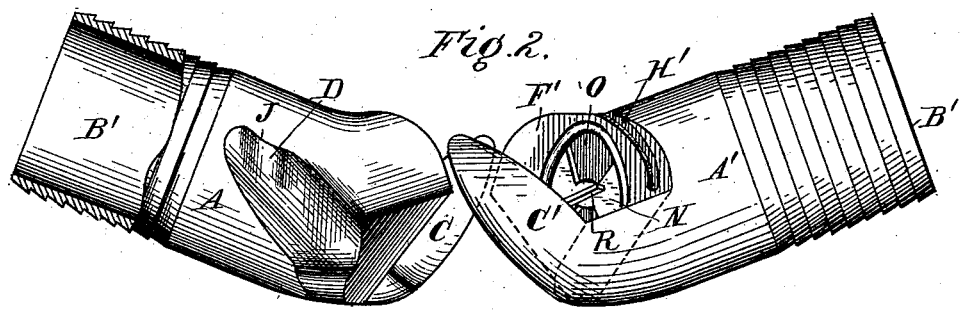
Fig. 2.
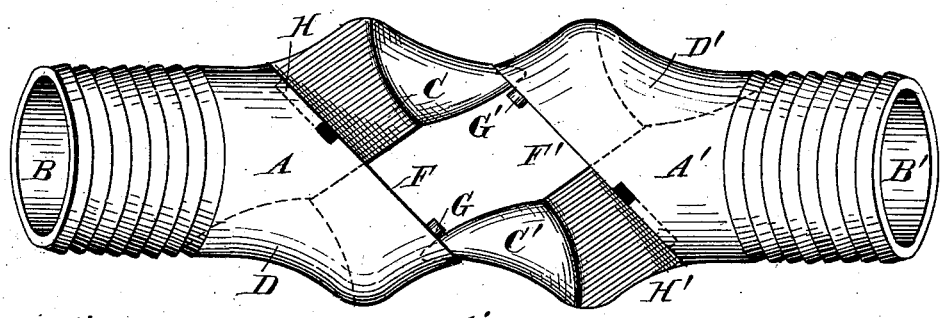
Fig. 4.  Fig. 3.  Fig. 5.
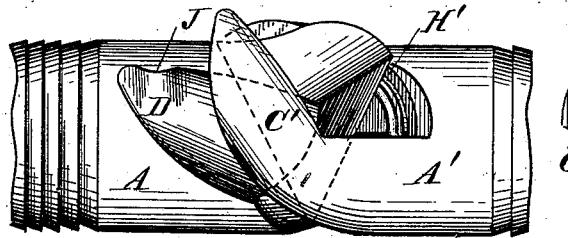
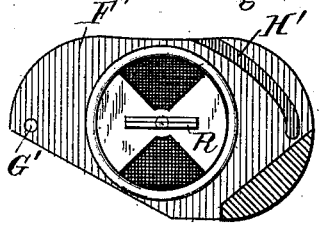
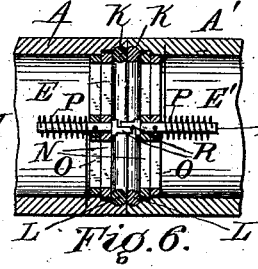
Fig. 6.
Witnesses:
Saml. B. Dover.
G. G. Jackson.
Inventor.
Robert E. Ismond
By Francis W. Parker
Att'y

UNITED STATES PATENT OFFICE.

ROBERT E. ISMOND, OF CHICAGO, ILLINOIS.

HOSE OR PIPE COUPLING.

SPECIFICATION forming part of Letters Patent No. 357,603, dated February 15, 1887.

Application filed August 7, 1886. Serial No. 210,298. (No model.)

*To all whom it may concern:*

Be it known that I, ROBERT E. ISMOND, a citizen of the United States, residing at Chicago, in the county of Cook and State of Illinois, have invented certain new and useful Improvements in Hose and Pipe Couplings, of which the following is a specification.

My invention relates to hose and pipe couplings such as are used to couple systems of pipes for the transmission of fluids, and particularly to couple such pipes on railway-cars, where the same are being used to supply water or to operate pneumatic or steam brakes.

The object of my invention is to provide a simple, cheap, and easily-detached hose-coupling, consisting of fac-simile parts meeting on a plane oblique to the length of the coupling and having suitable claws and recesses whereby they are locked together. I accomplish these objects by the mechanism illustrated in the accompanying drawings, wherein—

Figure 1 is a side view of the coupling. Fig. 2 is a side view of the parts uncoupled. Fig. 3 is a plan view of the parts uncoupled. Fig. 4 is a side view of the parts at the point where they are about to be rotated together. Fig. 5 is a view of one coupling-surface with the valve open. Fig. 6 is a cross-section of the coupling-surfaces in contact with the valve-keys interlocked.

Like parts are indicated by the same letter in all the parts.

A A' are the coupling-pieces; B B', their respective pipes. C C' are the claws; D D', the recesses which receive them. E E' are the passage-ways through them. F F' are their coupling-surfaces. G G' and H H' are pegs and grooves, respectively, thereon. J J are slightly-projecting surfaces on the upper edges of the recesses D D'. The peculiar shape of the grooves H H' is shown in Fig. 5. K is a groove in the end of the passage-way, into which the forwardly-projecting packing-ring L is sprung. M is a shaft journaled in the valve-piece N, which is secured to the walls of the passage-way. O is a valve-piece secured on the shaft. P is a spiral spring, one end of which is secured to the walls of the passage-way and the other is wound about and secured to the shaft. R is a key on the other end of the shaft, The use and operation of my invention are as follows: The two coupling-pieces are secured to the ends of the water systems of adjacent cars—in a train of stock-cars, for example. The two pieces are then seized and brought into the position shown in Fig. 4. Thus far they approach each other in a line approximately parallel with their length. To bring them closely together it is only necessary to rotate their contiguous surfaces by raising their other ends. By this action the pegs travel in the grooves until they nearly reach the ends thereof, when the coupling-pieces are closely drawn together by the action of the pegs, which pass into the sharply-curved end of the grooves, and the action of the claws, which spring over the projecting surfaces J J and into the recesses D D'. At this moment the coupling assumes the position shown in Figs. 1 and 2. The pegs and grooves serve also to center the pieces and make the passages register with each other.

It will be understood that as the coupling-surfaces approach each other the packing-rings will come into contact, and at the end of the act of coupling they will be closely pressed together, so as to form a tight joint. The action of the pegs and grooves would be exactly the same if they were placed at the inner and the groove at the outer end of the coupling-surface. The coupling is perfectly secure until the other parts are rotated, so as to bring the pieces into a line parallel with their length, when the pegs escape from the grooves and the coupling easily breaks. This is of course the action which takes place when any great strain is applied, as when the cars come apart. The valve in many cases and for certain uses is not required. It consists, as is shown, of two perforated pieces rotating on each other. The spiral spring is so set as to keep the valve closed when the parts are uncoupled. This it does automatically when the parts become uncoupled. As the parts come together, as shown in Fig. 4, the two keys will be in close proximity. As the parts are now turned the keys bear upon each other, as shown in Fig. 6, and each turns until, when the coupling is closed, the valves are open, as shown in Fig. 5.

I claim—

1. In a hose-coupling, the combination of fac-simile pieces, each complete without movable parts and provided with a forwardly-projecting claw, and a recess on one side of the coupling-piece and behind the claw, so that the parts are locked together when the claws engage the recess.

2. In a hose-coupling, the combination of fac-simile interlocking pieces having meeting surfaces at an angle oblique to their length, and each provided with a claw and a recess on one side thereof, as and for the purpose set forth.

3. In a hose-coupling, the combination of fac-simile interlocking pieces meeting on a line oblique to their length, and provided each with a claw and recess on one side thereof, and on its engaging-surface with a pin and a curved groove, as shown.

In testimony whereof I have hereunto set my hand in the presence of two witnesses.

ROBERT E. ISMOND.

Witnesses:
FRANCES W. PARKER,
CHAS. S. BURTON.